United States Patent
Selivanenko et al.

(10) Patent No.: US 10,688,436 B2
(45) Date of Patent: Jun. 23, 2020

(54) DEVICE FOR PRODUCING WATER HAVING REDUCED HEAVY MOLECULE CONTENT

(71) Applicant: OBSCHESTVO S OGRANICHENNOJ OTVETSTVENNOSTYU "MTK AJSBERG", Moscow (RU)

(72) Inventors: Igor Lvovich Selivanenko, Moscow (RU); Aleksandr Alekseevich Timakov, Moscow (RU)

(73) Assignee: OBSCHESTVO S OGRANICHENNOJ OTVETSTVENNOSTYU "MTK AJSBERG", Moscow (RU)

( * ) Notice: Subject to any disclaimer, the term of this patent is extended or adjusted under 35 U.S.C. 154(b) by 0 days.

(21) Appl. No.: 15/768,017

(22) PCT Filed: Oct. 12, 2016

(86) PCT No.: PCT/RU2016/000696
§ 371 (c)(1),
(2) Date: Apr. 13, 2018

(87) PCT Pub. No.: WO2017/065647
PCT Pub. Date: Apr. 20, 2017

(65) Prior Publication Data
US 2018/0311617 A1 Nov. 1, 2018

(30) Foreign Application Priority Data
Oct. 13, 2015 (RU) .................... 2015143707

(51) Int. Cl.
*B01D 3/10* (2006.01)
*B01D 3/14* (2006.01)
(Continued)

(52) U.S. Cl.
CPC ............. *B01D 59/04* (2013.01); *B01D 3/008* (2013.01); *B01D 3/106* (2013.01); *B01D 3/141* (2013.01);
(Continued)

(58) Field of Classification Search
CPC .......... B01D 3/10; B01D 3/101; B01D 3/103; B01D 3/104; B01D 3/106; B01D 3/108; B01D 3/141; B01D 3/16; C01B 5/02
See application file for complete search history.

(56) References Cited

U.S. PATENT DOCUMENTS 3,869,351 A * 3/1975 Schwartzman .......... B01D 1/00
202/172
4,681,661 A * 7/1987 Govind .................... B01D 3/04
202/154
(Continued)

FOREIGN PATENT DOCUMENTS

RU          2295493 C2    3/2007
RU          125092 U1 *    2/2013
(Continued)

OTHER PUBLICATIONS

Google patent Translation of RU 125,092 U1, (Year: 2012).*
(Continued)

*Primary Examiner* — Jonathan Luke Pilcher
(74) *Attorney, Agent, or Firm* — John Alumit (57) ABSTRACT

The device is designed for production of light, highly pure water with a high content of light molecules $^1H_2\ ^{16}O$.
The technical results are productivity increasшптп of the device and a reduction in energy costs per unit of the finished product.
The device is equipped with a heat pump, the distillation column consists of two coaxial tubes of diameter D1 and D2 with a layer of random packing located in the gap between
(Continued)

them, where (D1−D2)/2<300 mm, and the liquid distributor at the top of the column has at least 800 irrigation points per square meter of the cross-sectional area of the packing part of the column.

2 Claims, 7 Drawing Sheets (51) Int. Cl.
    *C01B 5/00*     (2006.01)
    *C01B 5/02*     (2006.01)
    *B01D 59/04*     (2006.01)
    *B01D 3/16*     (2006.01)
    *B01D 59/00*     (2006.01)
    *C02F 1/00*     (2006.01)
    *B01D 3/00*     (2006.01)
    *C02F 1/04*     (2006.01)
(52) U.S. Cl.
    CPC ............... *B01D 3/16* (2013.01); *B01D 59/00* (2013.01); *C01B 5/00* (2013.01); *C02F 1/00* (2013.01); *C02F 1/041* (2013.01); *B01D 3/10* (2013.01); *B01D 3/14* (2013.01); *C01B 5/02* (2013.01); *Y02P 20/129* (2015.11)

(56) References Cited

U.S. PATENT DOCUMENTS

| | | | | |
|---|---|---|---|---|
| 2008/0103092 A1* | 5/2008 | Pomytkin | ............ | A61K 9/0021 424/600 |
| 2008/0118463 A1* | 5/2008 | Pomytkin | ............ | A61K 9/0019 424/85.2 |
| 2008/0138439 A1* | 6/2008 | Soloviev | ................. | A61K 8/19 424/613 |
| 2008/0138470 A1* | 6/2008 | Soloviev | ................. | A61K 33/00 426/67 |
| 2008/0145507 A1* | 6/2008 | Soloviev | ................. | C12C 5/002 426/592 |
| 2008/0160100 A1* | 7/2008 | Pomytkin | ................ | A61K 8/19 424/600 |
| 2008/0160102 A1* | 7/2008 | Pomytkin | .............. | A01N 59/00 424/616 |
| 2008/0260857 A1* | 10/2008 | Pomytkin | .......... | A61K 41/0004 424/600 |
| 2008/0292718 A1* | 11/2008 | Pomytkin | ................. | A23L 2/52 424/600 |
| 2008/0292719 A1* | 11/2008 | Pomytkin | .............. | A61K 33/00 424/600 |
| 2008/0299221 A1* | 12/2008 | Pomytkin | .............. | A61K 33/00 424/600 |
| 2009/0324735 A1* | 12/2009 | Soloviev | ................. | A61K 33/00 424/600 |
| 2015/0374745 A1* | 12/2015 | Pomytkin | ............. | A61K 9/0095 424/600 |
| 2018/0028473 A1* | 2/2018 | Pomytkin | ............. | A61K 9/0095 |

FOREIGN PATENT DOCUMENTS

| | | |
|---|---|---|
| RU | 125092 U1 | 2/2013 |
| WO | WO 1996/033129 A1 | 10/1996 |

OTHER PUBLICATIONS

Saint-Gobain NorPro, "Packed Tower Internals Guide", 2001, Saint-Gobain NorPro Corporation Mar. 2001 TIG-2. Avaialble online at: http://www.razifar.com/cariboost_files/Packed_20Tower_20Internals_20Guide.pdf (Year: 2001).*

StillSmart.co.uk, Message board titled "spiral-prismatic packing", post by user "YHB" on Feb 18, 2012, Available online at: http://www.stillsmart.co.uk/forum/viewtopic.php?t=966 (Year: 2012).*

* cited by examiner

| Diameter of the column, mm | 100 | 150 | 200 | 250 | 300 | 350 |
|---|---|---|---|---|---|---|
| HETS, cm | 2,4 | 2,7 | 2,8 | 2,9 | 3,5 | 12,4 |

Table 1

| Number of irrigation points per square meter | 300 | 400 | 500 | 550 | 600 | 800 |
|---|---|---|---|---|---|---|
| HETS, cm | 15,4 | 14,5 | 13,1 | 11,0 | 3,5 | 3,2 |

Table 2

| Diameter of the outer column, mm | 300 | 700 | 800 | 700 |
|---|---|---|---|---|
| Diameter of the inner column, mm | 0 | 100 | 200 | 50 |
| HETS, cm | 3,2 | 3,8 | 4,2 | 14,5 |
| (D1-D2)/2, mm | 150 | 300 | 300 | 325 |

Table 3

FIG. 5 (CONTINUED)

| Device | Area of cross section of the horizontal surface of a packing, cm$^2$ | Specific energy consumption, kW.h/kg of the product | HETS, cm | Deuterium content in the finished product, ppm | Capacity of the device, kg/h | Specific energy consumption kW.h/kg of the product |
|---|---|---|---|---|---|---|
| The closest analogue, D=100mm | 78,5 | 30 | 2,7 | 10 | 0,4 | 30 |
| The claimed device, D1=400mm, D2=100mm. Heat pump chiller, power of the electric drive of compressor 48kW | 1177,5 | 8 | 3,8 | 10 | 6,0 | 8 |
| The claimed device, D1=700mm, D2=100mm. Heat pump chiller, power of the electric drive of compressor -200kW | 3768 | 10 | 4,0 | 10 | 20 | 10 |
| The claimed device, D1=400mm, D2=200mm. Heat pump mechanocompressor pair. Degree of compression of vapor 2 | 942 | 4 | 3,6 | 10 | 5,2 | 4 |

Table 4

FIG. 6

DEVICE FOR PRODUCING WATER HAVING REDUCED HEAVY MOLECULE CONTENT

TECHNICAL FIELD

The invention relates to a rectifying device for water purification from impurities in the form of water molecules containing heavy isotopes of hydrogen and oxygen, and more specifically it relates to a device for producing light, highly pure water with an increased content of light molecules $^1H_2^{16}O$. The invention can be used in the food industry, medicine, agriculture, housing and communal services, as well as in the manufacture of cosmetics and perfumes.

DESCRIPTION OF THE PRIOR ART

The quality and purity of water used in different areas of industry make an important contribution to the quality of the final product and have an effect on the technological characteristics of the production process. The quality and safety of food and beverages, including drinking water, determine the quality of life and health of a person. The water molecule ($H_2O$) consists of two chemical elements—hydrogen H and oxygen O. In turn, each element is a combination of several isotopes [1]. Stable isotopes of hydrogen and stable isotopes of oxygen form 9 isotopic varieties of water molecules, namely: $^1H_2\ ^{16}O$, $^1H_2\ ^{17}O$, $^1H_2\ ^{18}O$, $^1HD^{16}O$, $^1HD\ ^{17}O$, $HD^{18}O$, $D_2\ ^{16}O$, $D_2\ ^{17}O$, $D_2\ ^{18}O$. In quantitative terms, the bulk of the water of natural sources is represented by $^1H_2\ ^{16}O$ molecules, consisting of light isotopes $^1H$ and $^{16}O$. The quantity of water molecules containing heavy isotopes: D, $^{17}O$, $^{18}O$, depends on the concentration of these isotopes, which in natural water varies within the limits fixed in the basic standards for the isotope composition of the hydrosphere VSMOW and SLAP [2]. In natural water, the weight concentration of the molecules $^1H_2\ ^{17}O$, $^1H_2\ ^{18}O$, $^1HD\ ^{16}O$, $^1HD^{17}O$, $^1HD^{18}O$, $D_2\ ^{16}O$, $D_2\ ^{17}O$, $D_2\ ^{18}O$ can be up to 2.97 g/l, which exceeds the allowable salt content in drinking water. The physical, chemical and biological properties of water kinds with relatively high concentration of heavy isotopes (high concentration of D, high concentration of oxygen $^{17}O$ and oxygen $^{18}O$) differ significantly both from each other and from the properties of natural water. For example, difference is observed in the boiling and freezing temperatures, in the density and in the rate of chemical and biochemical reactions [3, 4.5]. This allows us to consider the aforementioned heavy isotopic modifications of $H_2O$ as various independent substances, which are impurities relative to water $^1H_2\ ^{16}O$. The reaction of biosystems under the influence of water, can vary according to the quantitative and qualitative changes in the isotopic composition of water. The use of water with an increased concentration of heavy isotopes, in particular deuterium, causes pronounced toxic effects at the level of the organism [4]. At the same time, positive biological activity of water with reduced deuterium concentration has been recorded at different organisms [4, 6-10]. Thus, the creation of devices for water purification from heavy molecules is an urgent task.

The state of the art in the production of isotope-light water is represented by a number of patents.

Thus, a method and devices are known for producing "thaw" and "relic" water with a reduced content of heavy isotopes of deuterium and tritium, see patents RU2031085C1, IPC C02F9/00, B01D19/00, publ. Mar. 20, 1995, RU2091335C1, IPC C02F9/00, publ. Sep. 27, 1997, RU2091336C1, IPC C02F9/00, publ. Sep. 27, 1997, RU2525494C2, the IPC C02F1/22, C01B5/02, B01 D59/08, C02F103/04, publ. Aug. 20, 2014. The essence of the known method consists in that it includes the operations of cooling and freezing water with subsequent operations of thawing of frozen water. However, the degree of purification of water from deuterium in such devices is low and it cannot achieve deuterium concentration less than 136 ppm.

Also devices are known that allow achieving a fairly significant deuterium depletion of water using the electrolysis of water with the subsequent combustion of hydrogen in an oxygen environment. See, for example, patents RU2182562C2, IPC C02F1/46, B01D59/00, C02F103: 04, publ. May 20, 2002. and RU125092U1, IPC B01D59/00, publ. Feb. 27, 2013. But the productivity of the above devices is low. Disadvantages of such devices include multistage process, contamination of the final product with transition metals during the hydrogen combustion, fire and explosion hazard.

The apparatuses with a distillation column are closer to the claimed invention in terms of the technical nature. At present, rectification devices for producing water with reduced deuterium content operating under vacuum with a regular and random packing are known. See, for example, patents RU125092U1, IPC B01D59/00, publ. Feb. 27, 2013, RU2125817C1, IPC A23L2/00, A61K33/00, publ. 10 Feb. 1999, RU2139062C1, IPC A61K33/00, A61K7/00, A61K9/00, publ. 10 Oct. 1999 and international application WO9308794A1, IPC A61K9/08, 33/00, publ. 13 May 1993.

Regular packing is usually used in the form of rolls, bags and blocks. Such packing, having an ordered structure, prevents the occurrence of unforeseen stagnant zones that are often present in random packing. In addition, it is able to work with high loads in the vapor phase, has a lower intrinsic resistance. Columns with regular packing are the most effective rectifying apparatus. The world leaders in the field of research and development of regular packing are the companies SULZER, NORTON and GLITSCH. The effectiveness of the best samples of their industrial packing is 5-6 t.t./m (theoretical trays per 1 in of the height of the packing) with the load factor $F=1.5-2.0\ kg^{0.5}/(s*m^{0.5})$.

Since about 100 theoretical trays are required to achieve threefold decreasing in deuterium content of natural water, the use of such packing will require a column with a packing height of at least 17 m. This significantly limits the widespread use of such devices to purify water from heavy water molecules. The use of a split column, as proposed in RU125092U1, complicates the design of the device and the placement of such a device in a standard room.

The closest in the technical nature to the claimed invention is the device with a random packing, described in the patent RU2295493C2, IPC C01D5/00, B01D59/00, B01D59/02, B01D3/14, publ. Mar. 20, 2007. A device for producing water with a reduced content of heavy water molecules, selected as the nearest analog, includes a water vapor preparation unit from initial water with a concentration of $^1H_2\ ^{16}O$ equal to $C_1$; a unit for supplying water vapor to the distillation column; a distillation column being a unit creating vapor-liquid interface between the descending liquid flow and the ascending vapor flow on the surface of the contact device within the distillation column as a result of counterflow of liquid and vapor, where both main liquid flow and the main vapor flow are directed along the column axis; a condensation unit for condensing of water vapor with an $^1H_2\ ^{16}O$ concentration equal to $C_2$ in a condenser installed at the top of the distillation column and accumulating a portion of the condensate in the form of condensed light water, with $C_2>C_1$; wherein the vapor pressure in the distillation column is from 0.05 to 0.6 bar and the yield of the condensed light water is from 0.001 to 0.25 of the total amount of water vapor passed through the distillation column.

The main weak point of the device according to RU2295493C2 is low device productivity and high energy costs per unit of finished product.

DISCLOSURE OF THE INVENTION

An object of the present invention is to provide a device with a random packing characterized by an increased productivity and a reduced energy cost per unit of finished product.

The technical results that are achieved with the use of the proposed invention are increasing the productivity of the device with a random packing and reducing the energy costs per unit of the finished product.

It is known [11] that an increase in mass exchange efficiency in columns with random packing can be achieved both by using more efficient packing structures and by optimizing the design of the entire column (the use of effective liquid and vapor flow redistributors, support grids, units for input and taking away of liquid and vapor phases).

Despite significant progress in the development of high-productivity devices with random packing, columns of this type have drawbacks that limit their application:
relatively low permissible loads;
significant material consumption;
the complexity of manufacturing highly efficient packing bodies.

From the literature it is known that the effectiveness of "ideal" packing columns, under certain conditions, should not depend on their diameters. To achieve this, it is necessary to ensure an uniform distribution of the flowing liquid per unit area of the packing mirror and the uniformity of the distribution of the rising vapor.

However, in practice, this is difficult to achieve, since with increasing column diameter a gradient of the vapor phase velocities appears in the packing layer, characterized by a higher velocity in the center of the section of the column and a decrease in velocity towards the wall.

In addition, channels for the liquid draining from above can be occurred in the packing layer. "Channeling" in the layer of the random packing leads to the appearance of uneven distribution of the liquid phase across the section of the column. These effects lead to a significant increase in the height of the equivalent theoretical separation stage (hereinafter referred to as "HETS") with increasing diameter of the column. Therefore, in practice, packing columns with high HETS have a diameter of not more than 150 mm [12]. This, in turn, does not allow the creation of high productivity devices.

The above technical results are achieved in an apparatus for producing water with a reduced content of heavy water molecules, including a distillation column operating under vacuum, an evaporator and a condenser.

The technical results are achieved by the fact that the device operates with a heat pump, the distillation column consists of two coaxial tubes of diameter D1 and D2 (D1>D2) with a layer of random packing located in the gap between them, where (D1−D2)/2<300 mm, and the liquid distributor at the top of the column has at least 800 irrigation points per square meter of the cross-sectional area of the packing part of the column. In this case, the random packing can be made in the form of a spiral-prismatic packing. As a working body of the heat pump, a refrigerant can be used.

The heat pump can also work by means of mechanical compression of water vapor. The device may include several series-connected heat pumps.

BRIEF DESCRIPTION OF THE DRAWINGS

The invention is illustrated by the following graphical materials.

Table 1 shows the values of HETS in packing columns of cylindrical section filled with a spiral prismatic packing 3×3×0.2, depending on the diameter of the column.

Table 2 shows the values of HETS in packing columns of cylindrical section filled with a spiral prismatic packing 3×3×0.2, depending on the number of irrigation points per square meter of the cross-sectional area of the packing column for a column with a diameter of 300 mm. Table 3 shows the values of HETS in packing columns of a ring cross section filled with a spiral-prismatic packing 3×3×0.2, depending on the size of the column for a liquid distributor with 800 irrigation points per square meter of the cross-sectional area of the packing part of the column.

Table 4 shows the parameters of the claimed device and the closest analog for the production of water of the same degree of purification.

The positions in FIG. 3-5 are:
1—outer tube; 2—inner tube; 3—a packing layer located in the space between said coaxial tubes; 4—support grid; 5—liquid coming from above; 6—liquid flow distributor, 7—vapor coming from below, 8—distillation column; 9—electric heating elements (hereinafter referred to as heating elements) to start the device; 10—condenser-dephlegmator; 11—the pump; 12—container for product collection; 13—evaporator of the heat pump device; 14—the compressor; 15—condenser of the heat pump device—boiler; 16—cube of the column; 17—throttle valve; 18—feeder line; 19—line of the dump; 20—recuperative heat exchanger.

EMBODIMENT DESCRIPTION

The known liquid flow distributors used in the packing columns have an irrigation number of 100 to 300 per m2 of the apparatus section. We have experimentally found that using of an effective liquid distributor with at least 800 irrigation points per square meter of the cross-sectional area of the packing part of the column allows increasing the diameter of a column filled with a spiral prismatic packing up to 300 mm, practically without changing the HETS (see Tables 1, 2). In this case, the degree of unevenness of the distribution of liquid per 1 m of the height of the packing decreases to 5%, which dramatically increases the efficiency of the column.

Figure 1:
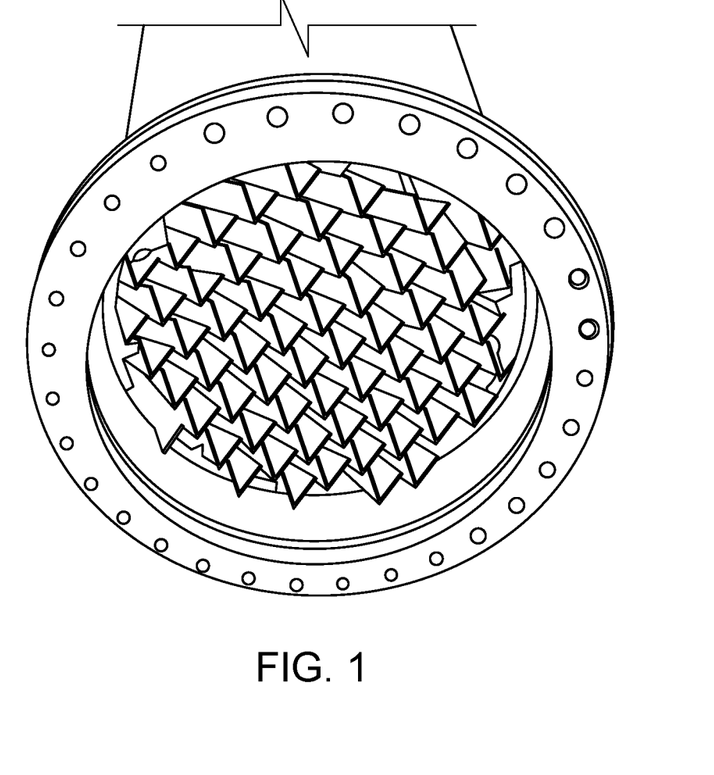
FIG. 1 is a photo of a support grid that simultaneously functions as a vapor flow redistributor.
Figure 2:
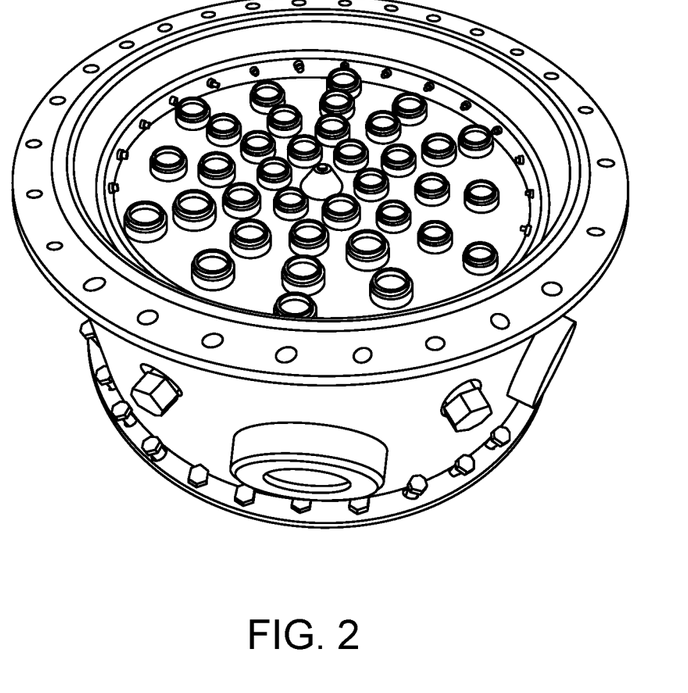
FIG. 2 is a photo of the liquid flow distributor.

FIG. 1 shows a photo of a vapor flow redistributor used by the inventors, and FIG. 2 shows a photo of a liquid distributor.

Table 1 shows the change in HETS in packing columns of cylindrical section filled with a spiral prismatic packing 3×3×0.2 depending on the diameter of the column. The liquid distributor has 800 irrigation points per square meter of the cross-sectional area of the packing column.

Table 2 shows the change in HETS in packing columns of cylindrical section filled with a spiral prismatic packing 3×3×0.2, depending on the number of irrigation points per square meter of the cross-sectional area of the packing part of the column. The column is 300 mm in diameter.

The determination of HETS was carried out according to the degree of separation of hydrogen isotopes in the distillation column in the stationary state and the non-taking away mode [12]. To do this, after the column enters the stationary state (when the profile of concentrations stops changing), water samples were taken from the condenser ($[D]b$) and from the cube ($[D]n$) of the column, and the calculation of the following have been done:

degree of separation of the column K by the equation:

$$K=[D]n/[D]b;$$

the number of theoretical separation stages (NTSS) N according to the Fenske equation for the non-taking away mode:

N=ln K/ln α, where α is the average hydrogen isotope separation factor in the column.

Further, the HETS was calculated by the equation:

$$HETS=H/N,$$

where H is the height of the packing layer in the column.

As it can be seen from Table 1, further increasing in the diameter of the column of the cylindrical section is accompanied by a significant increase in the HETS and, correspondingly, the height of the column. This makes the use of columns with a diameter of more than 300 mm inefficient and, therefore, does not allow further increasing the productivity of a single device.

Figure 3:
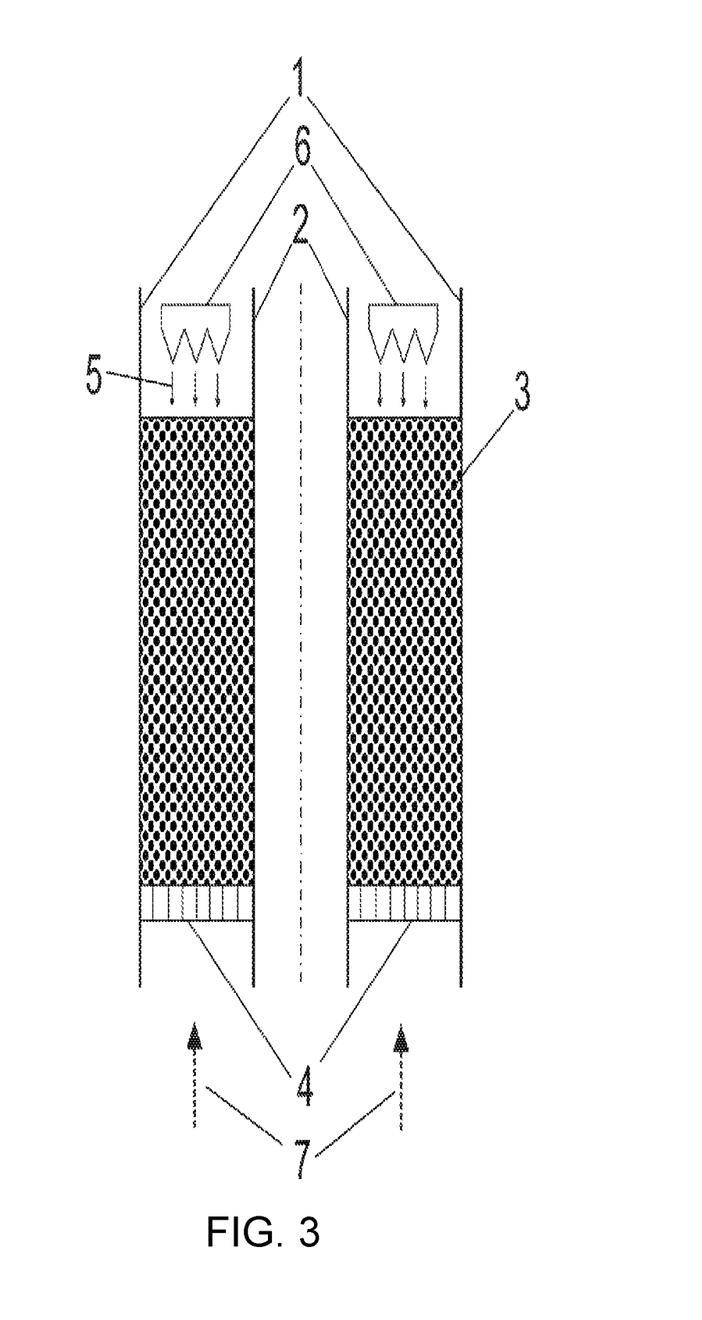
FIG. 3 shows a distillation column consisting of two coaxial tubes.

The authors have experimentally proved, see Table 3, that, for the solution of the problem, it is possible to use columns of a larger diameter without losing the HETS. For this purpose, it is proposed to use a distillation column consisting of two coaxial tubes of diameter D1 and D2 (D1>D2) with a layer of random packing located in the gap between them (see FIG. 3). In this case, the distance between the walls should not exceed 300 mm. That is, the following condition must be met: (D1−D2)/2 is less than or equal to 300 mm. This makes it possible to substantially increase the cross-sectional area of the packing part of the column at the same distance between the walls as the cylindrical column. For example, with the diameter of the outer column 700 mm and the diameter of the inner column 100 mm, the cross-sectional area of the packing column will be 5.3 times larger than the cross-sectional area of a single cylindrical column of 300 mm in diameter. The distance between the walls will be the same 300 mm.

This technical solution allows to increase the productivity of the device significantly when using columns with a diameter of more than 300 mm without reducing the HETS.

The change of the HETS in packing columns of ring cross section filled with a spiral prismatic packing 3×3×0.2 depends on the dimensions of the column. The fluid distributor has 800 irrigation points per square meter of the cross-sectional area of the packing part of the column.

The central (inner) tube can also be filled with a packing and be an independent column of solid cross section with a separate cube and a condenser.

Figure 4:
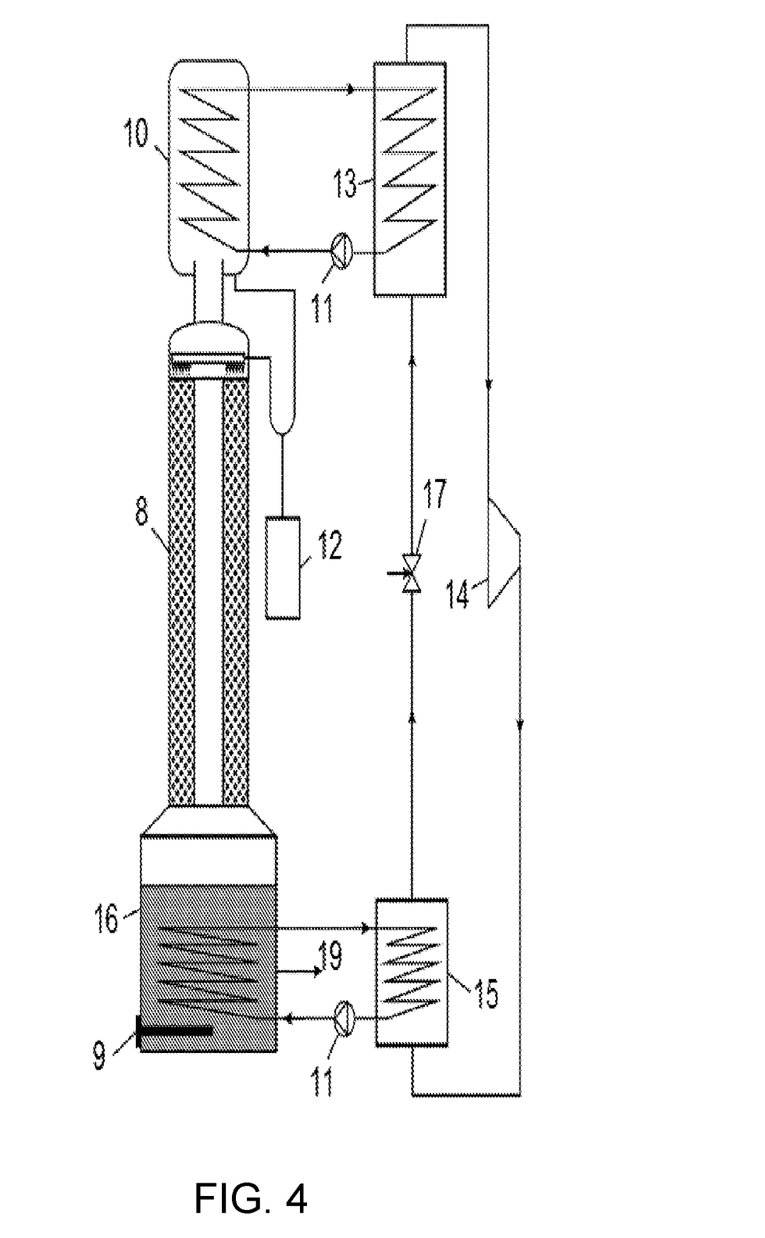
FIG. 4 shows the claimed device, with a heat pump, being a chiller operating with freon as refrigerant.

One way to reduce heat consumption on rectification devices is to use the heat of vapor condensation at the top of the column to heat the product in the column cube. However, due to the temperature difference between the top and bottom of the column, it is impossible to directly use the heat of condensation of the upper product vapor. In this case, a rectification scheme with a heat pump can be used. FIG. 4, shows a schematic diagram of a device in which a chiller operating with freon as refrigerant is used as a heat pump.

The distillation column (see FIG. 3) consists of an outer and an inner coaxial tubes. The packing layer is located in the space between the coaxial tubes on the support grid, which is also a redistributor of the vapor flow. The packing is designed to increase the interaction surface between the ascending vapor flow and the descending flow of liquid in the distillation column. The liquid comes from above through the distributing unit, vapor comes from below. The water vapor obtained in the cube of the column enters the distillation column, which is the unit of interaction between the ascending vapor flow and the descending flow of the liquid.

The vapors leaving the top of the distillation column 8 (see FIG. 4) are fed to the condenser-dephlegmator 10, where they condense, giving heat to the water of the intermediate circuit. The condensate formed is partially fed to the product collection tank 12, partly to the irrigation of the column 8. The circulation of the water of the intermediate circuit between the condenser-dephlegmator 10 and the evaporator of the heat pump device 13 is provided by a pump 11. In the evaporator 13, the coolant of the heat pump device is evaporated by means of cooling the network water of the intermediate circuit. The refrigerant vapor is compressed by the compressor 14 and supplied to the condenser of the heat pump device—the boiler 15. With a certain ratio of the parameters it may happen that the heat of condensation of the coolant is not enough to evaporate the water. In this case, the heat deficit is covered by electric heating elements 9, which are also necessary for the initial (starting) heating of the device.

The operation of the claimed device can be demonstrated by the following examples.

* It should be noted that the examples are given only to illustrate the effectiveness and capabilities of the present invention, without limiting the scope of its application in any way.

Example 1

The initial distilled water enters the column cube through the water supply line. When the column is started, the vapor is produced with the help of heating elements with a total power of 80 kW. Further the column operates using a heat pump while heating elements are switched off. The heat pump is a chiller operating with refrigerant-freon R134a. The electric power of the compressor drive is 48 kW. The distillation column consists of external and internal coaxially located tubes. The diameter of the inner tube is 100 mm, the diameter of the outer tube is 400 mm. The distance between the walls is 150 mm. The packing layer is located in the space between the coaxial tubes on the support grid, which is also a redistributor of the vapor flow. The packing consists of 3 mm spiral-prismatic elements made of stainless steel wire of 0.2 mm diameter. The specific surface of the packing is 2800 $m^2/m^3$, the proportion of the free volume is 0.9 $m^2/m^3$. The liquid comes from above through the distribution device, vapor comes from below. The fluid distributor has 800 irrigation points per square meter of the cross-sectional area of the packing part of the column. The process of mass transfer occurs by counterflow of liquid and vapor were the main flow of liquid and the main flow of vapor are directed along the axis of the column. The column is made of stainless steel 02X12T, the wall thickness is 2 mm, the height of the column is 6000 mm.

The process of water vapor enrichment with the lightest water molecules takes place in the distillation column at the packing surface at a temperature of 60° C. and a pressure of 0.2 bar. The vapors leaving the top of column 8 (see FIG. 4) enter the condenser-dephlegmator 10, where they condense, giving heat to the water of the intermediate circuit. The formed condensate is partially supplied to the collection tank 12, partly to the irrigation of the column 8. Circulation of the water of the intermediate circuit between the condenser-dephlegmator 10 and the evaporator of the heat pump device 13 is provided by the pump 11. In the evaporator 13, the coolant of the heat pump device is evaporated by means of cooling the network water of the intermediate circuit. The refrigerant vapors are compressed by the compressor 14 and supplied to the condenser of the heat pump device—boiler 15. The resulting vapor with an increased content of $^{1}H_{2}$ $^{16}O$ in amount of 240 l/h is condensed in the condensation unit located at the top of the distillation column. The yield of the condensed light water is 0.025 of the total amount of water vapor passing through the distillation column and is equal to 6 l/h. The finished product is light water with an increased content of $^{1}H_{2}$ $^{16}O$ molecules, residual deuterium content of 10 ppm and heavy oxygen water ($^{1}H_{2}$ $^{18}O$)—800 ppm.

Example 2

All operations are the same as in example 1. The electrical power of the heat pump compressor drive is 200 kW. The dimensions of the column: the diameter of the inner tube is 100 mm, the diameter of the outer tube is 700 mm. The distance between the walls is 300 mm. The yield of the finished product—light water with a residual deuterium content of 10 ppm and heavy oxygen water ($^{1}H_{2}$ $^{18}O$) content of 800 ppm—is 20 l/h.

Example 3

Figure 5:
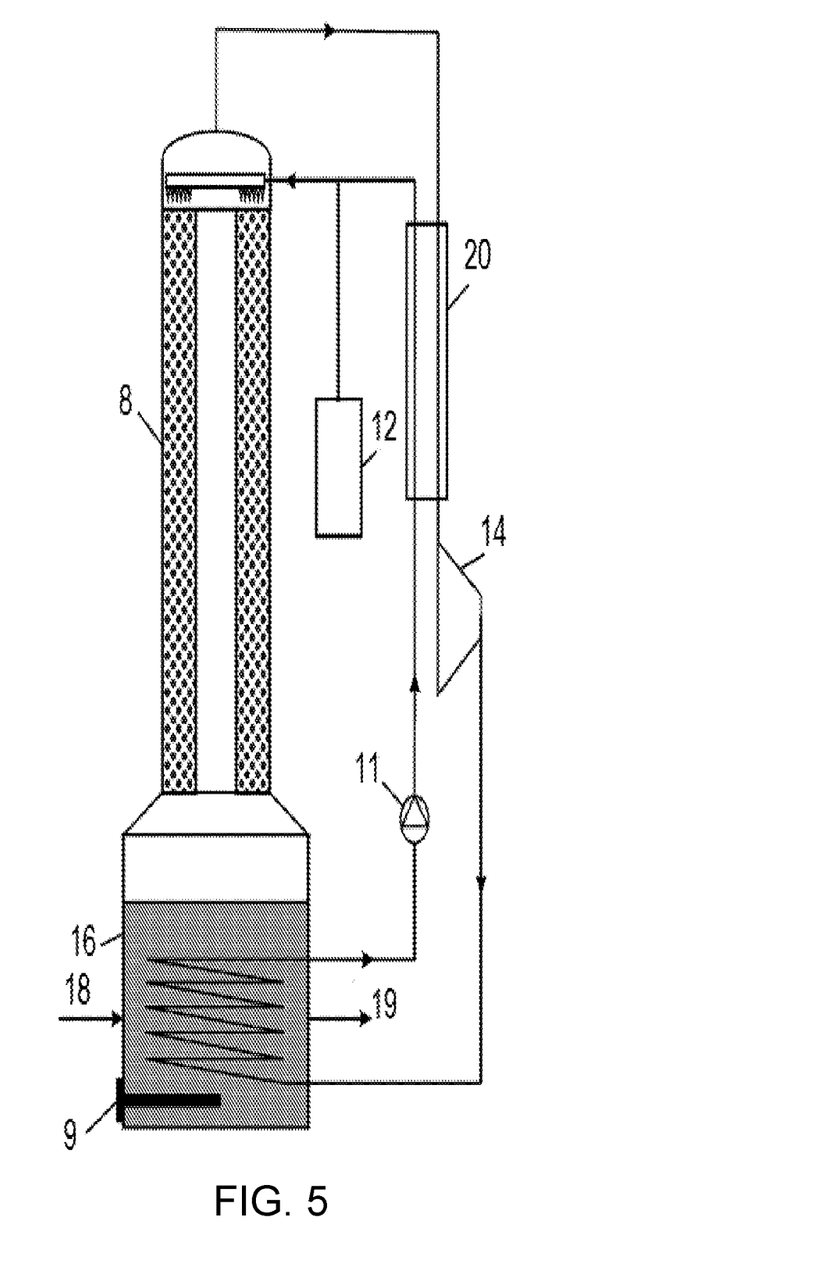
FIG. 5 shows the claimed device, with a heat pump working by means of mechanical compression of water vapor.
Figure 6:
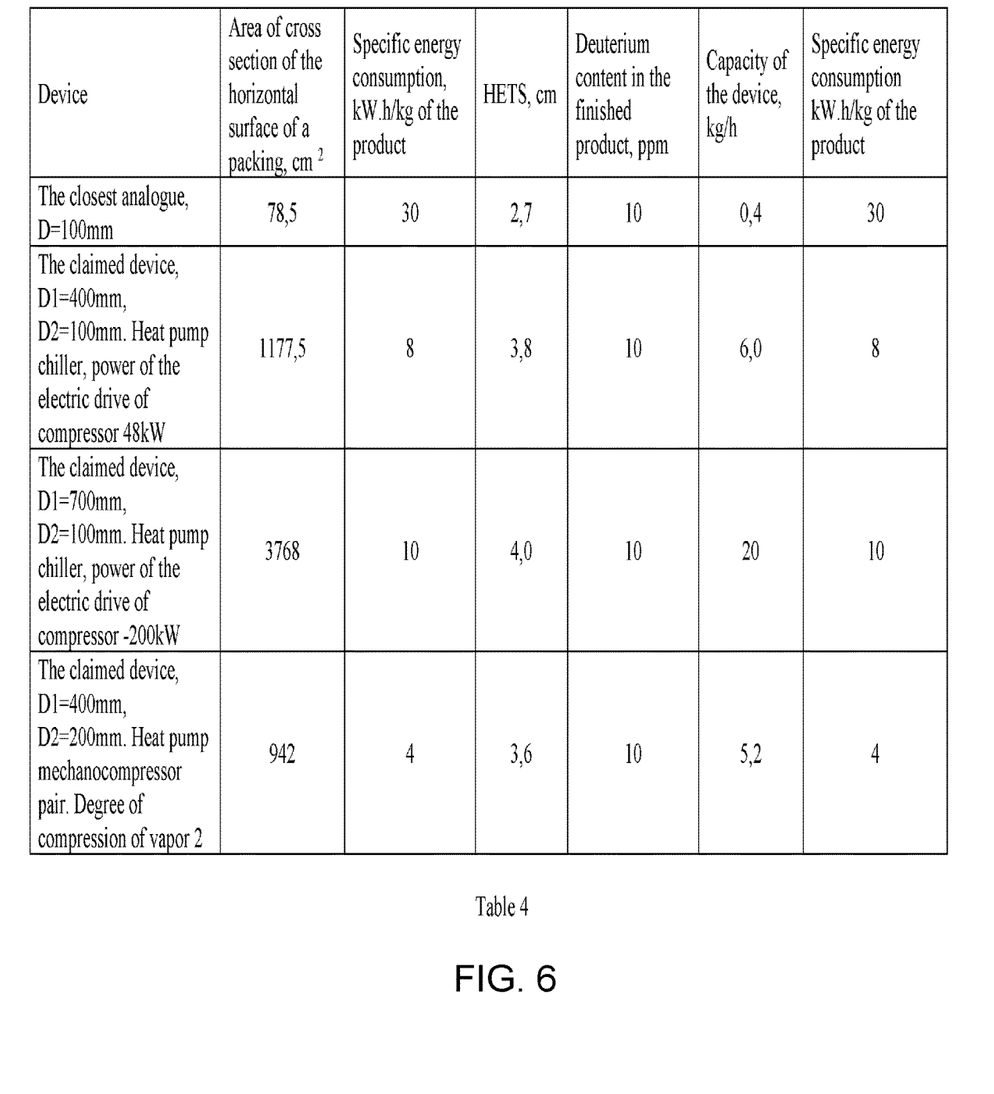
FIG. 6 shows Tables 1-4.

FIG. 5 shows the operation of the claimed device with a heat pump using distillate vapors that are directly supplied to the compressor and the heat pump of the device operates by means of mechanical compression of water vapor. The original distilled water enters the column cube through the water supply line. When the column is started, the vapor is produced with the help of heating elements with a total power of 80 kW. Further the column operates using heat pump while heating elements are switched off. The distillation column consists of external and internal coaxially located tubes. The diameter of the inner tube is 200 mm, the diameter of the outer tube is 400 mm. The distance between the walls is 100 mm. The packing layer is located in the space between the coaxial tubes on the support grid, which is also a redistributor of the vapor flow. The packing is 3 mm spiral-prismatic elements made of stainless steel wire of 0.2 mm diameter. Specific surface of the packing is 2800 m$^2$/m$^3$, the proportion of free volume 0.9 m$^2$/m$^3$. The liquid comes from above through the distribution device, vapor—comes from below. The fluid distributor has 800 irrigation points per square meter of the cross-sectional area of the packing part of the column. The process of mass transfer occurs by counterflow of liquid and vapor where the main flow of liquid and the main flow of vapor are directed along the axis of the column. The column is made of stainless steel 02X12T, the wall thickness is 2 mm, the height of the column is 6000 mm. The column is operated at a temperature of 60° C. and a pressure of 0.2 bar. The vapors leaving the top of column 8 in amount of 210 l/h are compressed by a mechanical vapor compressor 14 and supplied to the heat exchanger of column cube 16 where they condense by evaporating the water in the cube at a lower pressure. The water vapor from the cube rises up the column and again enters the mechanical compressor 14 with a vapor compression ratio of 2. Formed condensate is supplied by the pump 11 into the tank to collect the product 12 and to irrigate the column. In this case, only 0.025 of the condensate amount, equal to 5.2 liters, enters the tank for collecting the product 12, and the rest is supplied to the irrigation of the column 8. The finished product is light water with an increased content of $^{1}H_{2}$ $^{16}O$ molecules, a residual deuterium content of 10 ppm and a heavy oxygen water ($^{1}H_{2}$ $^{18}O$)) content of 800 ppm. To increase the efficiency of the heat pump, a recuperative heat exchanger 20 is used, in which the vapors emerging from the top of the column are heated with condensate and the condensate returns from the column cube heat exchanger.

Table 4 shows the parameters of the claimed device and the closest analog for the production of water of the same degree of purification.

As can be seen from the Table, the claimed invention far exceeds the closest analogue in energy efficiency and productivity.

INFORMATION SOURCES

1. Glinka. General chemistry. M.: "Chemistry", 1975, p. 102.
2. Ferronsky V. I., Polyakov V. A. Isotopes in the hydrosphere. M.: Nauka, 1983, p. 47, p. 10, 47, 46, 10.
3. Andreev B. M., Zelvensky Ya. D., Katalnikov S. G. Heavy isotopes of hydrogen in nuclear engineering. Moscow: Izdat, 2000, p. 186.
4. Lobyshev V. I., Kalinichenko L. P. Isotopic effects of D2O in biological systems. Moscow: Science, 1978.
5. Goncharuk V. V., Lapshin V. B., Burdeynaya T. N., Chernopyatko A. S. and others. Physico-chemical properties and biological activity of water depleted in heavy isotopes. Chemistry and technology of water—2011-V.33, N 1.-p. 15-25.
6. Strekalova T., Evans M., et al. Deuterium content of water increases depression susceptibility: The potential role of a serotonin-related mechanism.//Behav. Brain Res. Epub 2014 Aug. 1.
7. Martynov A. K., Artemkina I. V., Timakov A. A., Moskvicheva T. I. Evaluation of the biological activity of water with a low deuterium content. Materials of the interdisciplinary conference with international participation "New biokybernetic and telemedicine technologies of the XXI century", Petrozavodsk, Jun. 23-25, 2003, p. 57.
8. Sinyak Yu. E., Levinskikh M. A., Gaidadymov V. V., Guskova E. I., Signalova O. B., Derendyaeva T. A. Influence of water with a deuterium depletion on the cultivation of higher plants: *Arabidopsis thaliana* and *Brassica rapa*. The organism and the environment: life support and protection of a person in extreme conditions. Materials of the Russian Conference. Moscow, 2000, vol. 2, p. 90.
9. Sinyak Yu. E., Grigoriev A. I., Gaydadymov V. V., Mednikova E. I., Lebedeva Z. N., Guskova E. I. The method of obtaining deuteriumless water and studying its effect on the physiological status of the Japanese quail. Space Biology and Aerospace Medicine. Materials of the XI conference, 1998, vol. II, p. 201.
10. M. G. Baryshev, A. A. Basov, S. N. Bolotin, S. S. Dzhimak, D. V. Kashaev, S. R. Fedosov, V. Yu. Frolov, D. I. Shashkov, D. A. Lysak, A. A. Timakov NMR, EPR, and mass spectroscopy estimates of the antiradical activity of water with modified isotope composition. Bulletin of the Russian Academy of Sciences Physics December/2012; 76 (12).
11. Leontyev V. S., Sidorov S. I. Modern packing columns: features of constructive design. Chemical industry. 2005, No. 7, p. 347-356.
12. Andreev B. M. Zelvensky Ya. D.; Katalnikov, S. G. "Separation of stable isotopes by physico-chemical methods". M.: Energoatomizdat, 1982.

The invention claimed is:

1. An apparatus to produce water with a lowered content of heavy water molecules including a vacuum distillation column, an evaporator and a condenser, characterized in that said apparatus comprises a heat pump, wherein the distillation column comprises two coaxial tubes of diameter D1 and D2, wherein D1>D2 and a layer of random packing is placed in an annular gap between them, and (D1−D2)/2<300 mm, and a liquid distributor at the top of the column has at least 800 irrigation points per square meter of a cross-sectional area of a packing part of the column.

2. The apparatus according to claim 1, characterized in that the random packing is in the form of a spiral prismatic packing material.

* * * * *